United States Patent [19]
Green et al.

[11] Patent Number: 4,991,521
[45] Date of Patent: Feb. 12, 1991

[54] FLUIDIZED BED COMBUSTION PROCESS AND APPARATUS

[75] Inventors: Gary J. Green, Yardley; Tsoung Y. Yan, Philadelphia, both of Pa.

[73] Assignee: Mobil Oil Corporation, Fairfax, Va.

[21] Appl. No.: 180,755

[22] Filed: Apr. 12, 1988

[51] Int. Cl.$^5$ ............................................. F23D 1/00
[52] U.S. Cl. .................................... 110/347; 110/245; 502/47
[58] Field of Search .................. 110/245, 347; 502/46, 502/47

[56] References Cited
U.S. PATENT DOCUMENTS

| | | | |
|---|---|---|---|
| 4,313,848 | 2/1982 | Scott | 252/418 |
| 4,325,833 | 10/1982 | Scott | 252/417 |
| 4,413,573 | 11/1983 | Hall et al. | 110/347 |
| 4,859,643 | 8/1989 | Sechrist et al. | 502/47 X |

Primary Examiner—Edward G. Favors
Attorney, Agent, or Firm—Alexander J. McKillop; Charles J. Speciale; Richard D. Stone

[57] ABSTRACT

A process and apparatus for fluidized bed combustion using a dense phase combustion zone over a dilute phase combustion zone. When used to regenerate FCC catalyst containing coke with relatively large amounts of $NO_x$ precursors, the catalyst is added to and partially regenerated in the dense phase zone and then falls down into the dilute phase zone. Most of the combustion air is added to the dilute phase and rises into and fluidizes the dense phase zone. $NO_x$ formed in the dilute phase is reduced to $N_2$ in the dense phase.

9 Claims, 5 Drawing Sheets

FIG. 4 NOₓ EMISSIONS - FIELD DATA FROM TYPICAL PRIOR ART REGENERATOR

FLUIDIZED BED COMBUSTION PROCESS AND APPARATUS

FIELD OF THE INVENTION

This invention relates to combustion in fluidized beds and especially to regeneration of fluidized catalytic cracking catalyst.

PRIOR ART

Catalytic cracking systems use catalyst in moving or fluidized beds. Catalytic cracking is carried out in the absence of added hydrogen, in contrast to hydrocracking in which $H_2$ is added during cracking. In the FCC process, an inventory of fine catalyst is continuously cycled between a cracking reactor and a catalyst regenerator. Hydrocarbon feed contacts the catalyst in a reactor, usually a riser reactor, at a temperature of 400°–650° C., preferably 460°–560° C. The hydrocarbons are cracked to more valuable, lighter products. During cracking, the hydrocarbons deposit carbonaceous coke on the catalyst. The cracked products are separated from coke deactivated, spent catalyst. The coked catalyst is usually stripped of volatiles, usually with steam, then passed to a catalyst regenerator. In the regenerator, the spent catalyst contacts air or oxygen or oxygen containing gas at high temperature and the coke is burned from the catalyst to restore its activity. The regenerator typically operates at 540°–850° C., preferably 575°–750° C. Flue gas formed by combustion of coke in the catalyst regenerator may be treated for removal of particulates or for conversion of carbon monoxide, after which as is normally discharged into the atmosphere. Because most FCC units now use zeolite containing catalyst, there is a strong incentive to obtain very clean catalyst. This is because the zeolite based FCC catalysts have superior properties when coke levels are reduced to extremely low levels, below 0.1 weight percent coke and preferably to a coke level less than 0.05 weight percent coke, ideally down to a coke level of about 0.01 weight percent coke.

Quite a lot of work has been done on improving FCC regenerators by adding various CO combustion promotors so that all of the carbon monoxide produced within the FCC regenerator will be afterburned to $CO_2$. Complete CO combustion in the regenerator reduces air pollution, and provides a hotter regenerator which promotes carbon burning and produces a cleaner catalyst.

Recent advances in CO combustion promotion are disclosed in U.S. Pat. Nos. 4,072,600 and 4,093,535 which disclose the use of combustion promoting metals such as platinum in cracking catalyst in concentrations of 0.01 to 50 ppm, or even to 100 ppm based on total catalyst inventory.

Although the modern FCC regenerators are very efficient at generating clean catalyst, it is still difficult to obtain catalyst that is quite as clean as desired. One reason for this is that FCC regenerators usually operate with one dense phase catalyst bed (where most of the coke burning occurs) and with a dilute phase above this. Such a regenerator design has quite a lot of backmixing. These regenerators are constantly agitated by the addition of regeneration gas in the bottom of the unit. Backmixing is not complete, but the unit operation approaches that of a CSTR or continuous stirred tank reactor. As a moderate amount of backmixing occurs, some catalyst can bypass the regenerator in whole or in part.

The use of CO combustion promoters, and more severe regeneration conditions to remove $CO_2$, has also created problems, namely increased emissions of $NO_x$ and $SO_x$. This is because sulfur and nitrogen compounds in the feed frequently end up in the hydrocarbonaceous coke. When this coke is burned in the FCC regenerator, $NO_x$ and $SO_x$ are formed if relatively intense oxidizing conditions are present therein. $NO_x$ emissions were not much of a problem in regenerators where most of the CO was not afterburned because the generally reducing atmosphere of these regenerators promoted reduction of $NO_x$ to $N_2$. The use of modern CO combustion promoters minimized CO pollution, but increased $NO_x$ pollution.

FCC regenerators suffer from another problem. A lot of regeneration gas must be added. Usually the regeneration gas is air, but occasionally, pure oxygen is added to a regenerator usually to supplement an FCC regenerator with a short term shortage of blower capacity.

Typically, the combustion air is added to a plurality of air distributors in the base of the regenerator. These air distributors are usually strong and long lasting, but in the severe errosive environment of the FCC regenerator (which may be in continuous operation for several years) some air distributors can break off. When an air distributor breaks off, most of the air added for combustion discharges out the broken pipe rather than the network of pipes. This poor air distribution means that portions of the FCC regenerator operate without sufficient oxygen to burn coke. More coke remains on some of the catalyst, and more CO remains to be afterburned in the dilute phase above the FCC regenerator dense bed.

Another problem with air distribution in the typical FCC regenerator through pipes in the base of the regenerator, is catalyst erosion. To ensure good air distribution, air is added at relatively high pressure, forcing it out through a multiplicity of holes drilled in the FCC air distributor pipes. A lot of energy is consumed in compressing the air and then depressuring at high velocity through holes drilled in pipes, but better air distribution results. The resulting high localized velocities experienced where the air is discharged from the air distributor into the FCC regenerator dense bed promote mixing of air and catalyst, but are hard on the catalyst and lead to increased catalyst attrition. A typical FCC unit loses up to about one percent (1%) per day of its catalyst inventory to catalyst fines, and a significant portion of this daily loss of catalyst can be attributed to the air distributor system.

Attempts have been made to solve some of the problems created by use of CO combustion promoters. An attempt was made to minimize the $NO_x$ problem in U.S. Pat. No. 4,313,848 by resorting to an FCC regenerator which operated without intense backmixing. Coke was removed from the catalyst by passing the coke containing catalyst down through a relatively quiescent regenerator. Catalyst flowed down, countercurrent to air addition $NO_x$ forms in the bottom of the bed, but as the $NO_x$ passes through the generally reducing atmosphere, where coked catalyst is added, $NO_x$ will be reduced to nitrogen. Some regenerated catalyst was removed from the very bottom of the bed and recycled to the top of the FCC regenerator, so that a layer of hot regenerated catalyst was on top of the incoming spent catalyst. Additional combustion air was added above the point of addition of spent catalyst, but below the point of return of hot recycled regenerated catalyst, so that CO in the flue gas could burn to $CO_2$ in the presence of catalyst, which acted as a heat sink.

Such an approach will significantly reduce $NO_x$ emissions, but the design is complicated. The regenerator requires multiple perforated plates which maintain plug-type downward flow of catalyst and minimize mixing of catalyst.

It would be beneficial if a simpler design were available which could overcome the problem of $NO_x$ emissions. It would also be beneficial if refiners who use conventional fluidized beds could add air or other combustion gas to the base of their regenerators without subjecting catalyst near the air inlet to the high gas velocities associated with conventional air distribution systems. It would also be beneficial if an air distribution method were available which did not rely on a network of pipes for air distribution, and which was not as subject to mechanical failure by erosion. Ideally, the air distributor should be one which could be taken out of service even while the FCC regenerator is in operation.

We discovered a new catalyst regenerator design, which overcomes many of the deficiencies of the prior art units. We turned the conventional FCC regenerator designs upside down, and provided a relatively dilute phase, of intense mixing, at the bottom of the FCC regenerator with a dense phase superimposed above the dilute phase. Above our dense phase bed is a conventional dilute phase bed which is also present in all conventional single bed FCC regenerators. Our approach has several advantages, including mechanical simplicity and countercurrent regeneration design which vigorously regenerates FCC catalyst.

BRIEF SUMMARY OF THE INVENTION

Accordingly, the present invention provides a fluidized bed combustion process wherein a combustible substance is burned with an oxygen containing gas to produce a flue gas characterized by a base zone comprising at least one high superficial vapor velocity, dilute phase, fluidized bed combustion zone wherein oxygen containing gas is added, and an upper dense phase, fluidized bed zone comprising a dense phase fluidized bed supported by and in open fluid communication with the dilute phase bed zone, wherein combustion occurs.

The invention can be better understood by reference to the attached drawings, which will now be described in greater detail.

Figure 1:
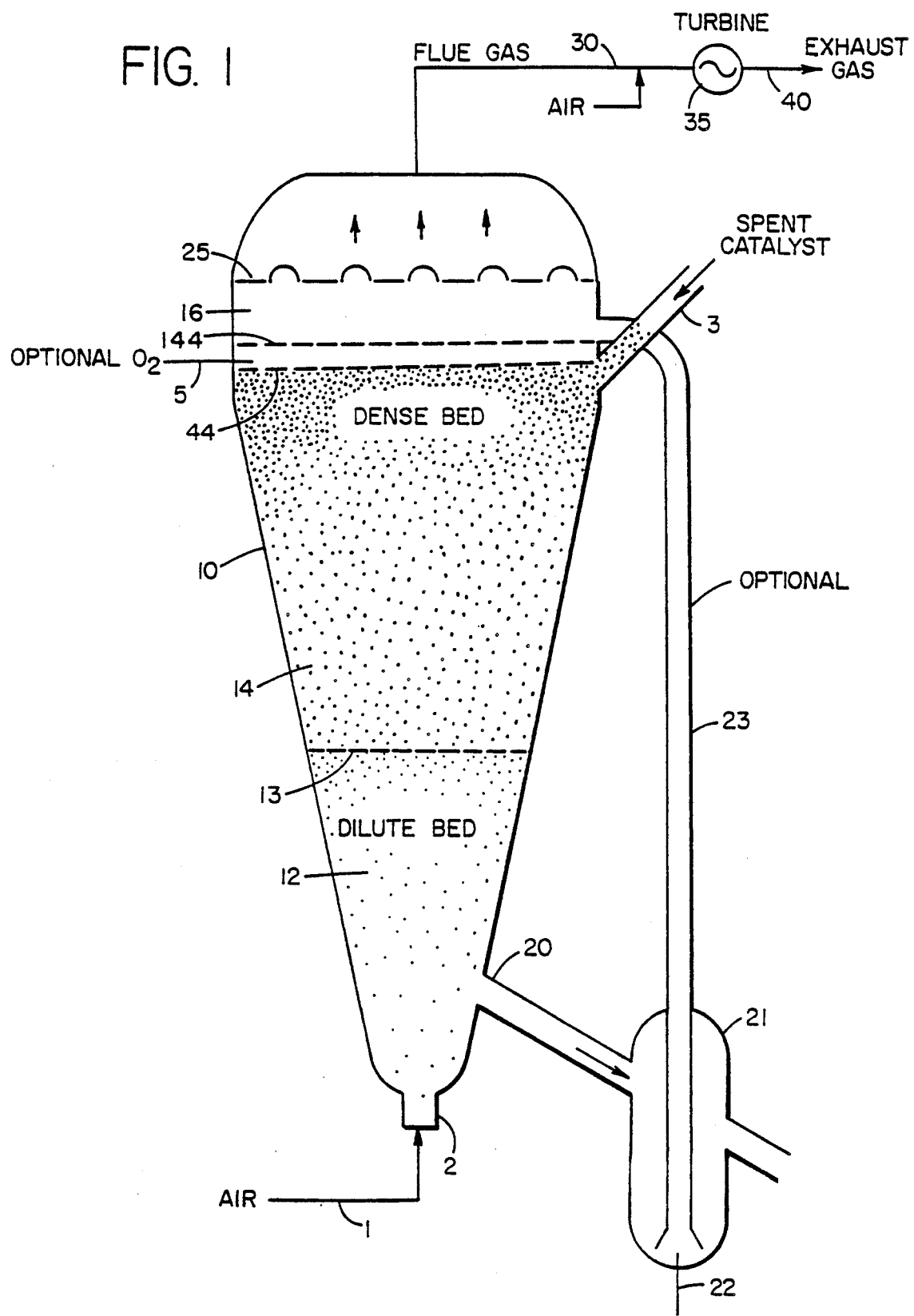
FIG. 1 is a simplified, schematic representation of a preferred embodiment of the FCC regenerator of the present invention.

FIG. 1 shows a preferred embodiment of the present invention. Spent catalyst is admitted to FCC regenerator 10 via line 3. The spent catalyst is added near the upper portion of the regenerator. Regeneration air is added via line 1 near inlet 2, located at the base of the regenerator.

The regenerator 10 is in the form of an inverted cone. The superficial velocity in the regenerator is highest at the base of the regenerator, and lowest at the upper portion of the regenerator.

Dilute phase fluidized bed 12 is characterized by high gas velocities, much backmixing and very efficient regeneration of catalyst.

The interface between dilute phase fluidized bed 12 and fluidized bed 14 is shown as a dotted line 13. The precise shape of and location of interface 13 is determined by the laws of physics. Below interface 13, the fluidizing velocity is high enough to support a dilute phase bed of catalyst. Above interface 13, the velocity exceeds the minimum fluidizing velocity needed to support a dense bed, and will usually be about 1 to 5 times the minimum fluidizing velocity.

The cross-sectional area of the top of the dilute phase bed 12, or the interface 13, is preferably 15 to 90% of the average cross-sectional area of the dense phase fluidized bed 14. For example, the arithmetic average of the cross-sectional area of dense bed 14 is 10 m² (determined by taking 33 ⅓% of the cross-sectional area of the top, middle and bottom of dense bed 14) then the cross-sectional area of interface 13 is preferably 1.5 to 9 m². Expressed as superficial vapor velocities, the vapor velocity in the dense phase might be from about 0.2 to 2 m/s, with a dilute phase velocity of about 2 to 20 m/s.

Much of the carbon on incoming catalyst is burned in dense bed 14 but quite a lot of coke removal also occurs in dilute bed 12. One of the advantages of the present invention, as compared to prior art, conventional, FCC regenerators containing a single dense bed of catalyst in the bottom of the regenerator is that bypassing of catalyst is minimized by the present design. It is difficult for a catalyst particle to escape dense bed 14 and pass through dilute bed 12 without having the desired amount of coke burn off. Although dense bed 14 is relatively quiescent, some backmixing is possible in such dense beds because they are fluidized. In dilute phase bed 12, backmixing is intense. It is unlikely that a particle of catalyst will totally bypass both the dense and dilute beds, which are in series. Another factor which tends to minimize the bad effects of bypassing is that even though catalyst residence time in dilute bed 12 is relatively short, conditions there are conducive to rapid coke combustion. This is because the oxygen concentration at the catalyst outlet to bed 12 is the highest of any place in the regenerator. Any coke remaining on partially regenerated catalyst entering dilute bed 12 will be rapidly burnt.

Conditions in regenerator 10 maximize catalyst regeneration and minimize formation of nitrogen oxides. First of all, much of the coke combustion occurs in a relatively reducing atmosphere, in dense bed 14, resulting in low conversion of coke nitrogen to $NO_x$. Furthermore, any nitrogen-containing coke which is burned in dilute bed 12 will undoubtedly form $NO_x$, but the $NO_x$ formed will be reduced in the relatively reducing atmosphere present in dense bed 14, by reaction, for example, with carbon on catalyst and with CO before the $NO_x$ can leave the FCC regenerator with the flue gas in line 30.

The design shown in FIG. 1 permits relatively complete CO combustion to be achieved while minimizing $NO_x$ emissions. This is done by recycling catalyst from the bottom of the regenerator to the top of the regenerator. More combustion air is added near the top of the regenerator. The recycled catalyst acts as a heat sink and absorbs the heat of CO combustion. Hot regenerated catalyst is removed via line 20 and discharged to lift pot 21. The desired amount of recycled catalyst is blown up with lift gas from line 22 into lift riser 23 and discharged on the top of the catalyst bed. Additional air or oxygen containing gas is also added, preferably somewhat above the point of addition of spent catalyst to the FCC regenerator. Quite a lot of air can h=added to many different elevations in the dense bed, provided a reducing atmosphere is maintained in much of the dense bed. As gas flows up, the extra combustion air can even be added below the point of spent catalyst addition. The optimum point of secondary air addition near the upper portion of the dense bed will probably vary some depending on coke level, $NO_x$ emissions permitted, and amount of CO combustion promoter present. Carbon monoxide formed in the dense bed will be completely afterburned to $CO_2$, but the heat of combustion will be absorbed by regenerated catalyst recycled to the top of the reactor.

When complete CO combustion is desired, it will be much easier to achieve if a small amount of conventional CO combustion promoter catalyst is added to the unit.

Flue gas leaves relatively dense fluidized bed 14 and enters a relatively dilute phase space 16 above dense fluidized bed 14. Flue gas preferably passes through optional filters or cyclones, shown as device 25, which remove small amounts of catalyst fines from flue gas. Commercially, cyclone separators are used to separate catalyst fines from flue gas, usually in two stages. Each stage usually comprises a plurality of cyclone separators. Flue gas with reduced particulate content is removed from the unit via line 30 and preferably passed through a power recovery turbine 35. Turbine exhaust gas is removed via line 40 and usually discharged to the atmosphere. If CO combustion is incomplete, air can be added to the flue gas via line 32 to complete the CO combustion and provide additional hot inlet gas to the power recovery turbine 35.

Figure 2:
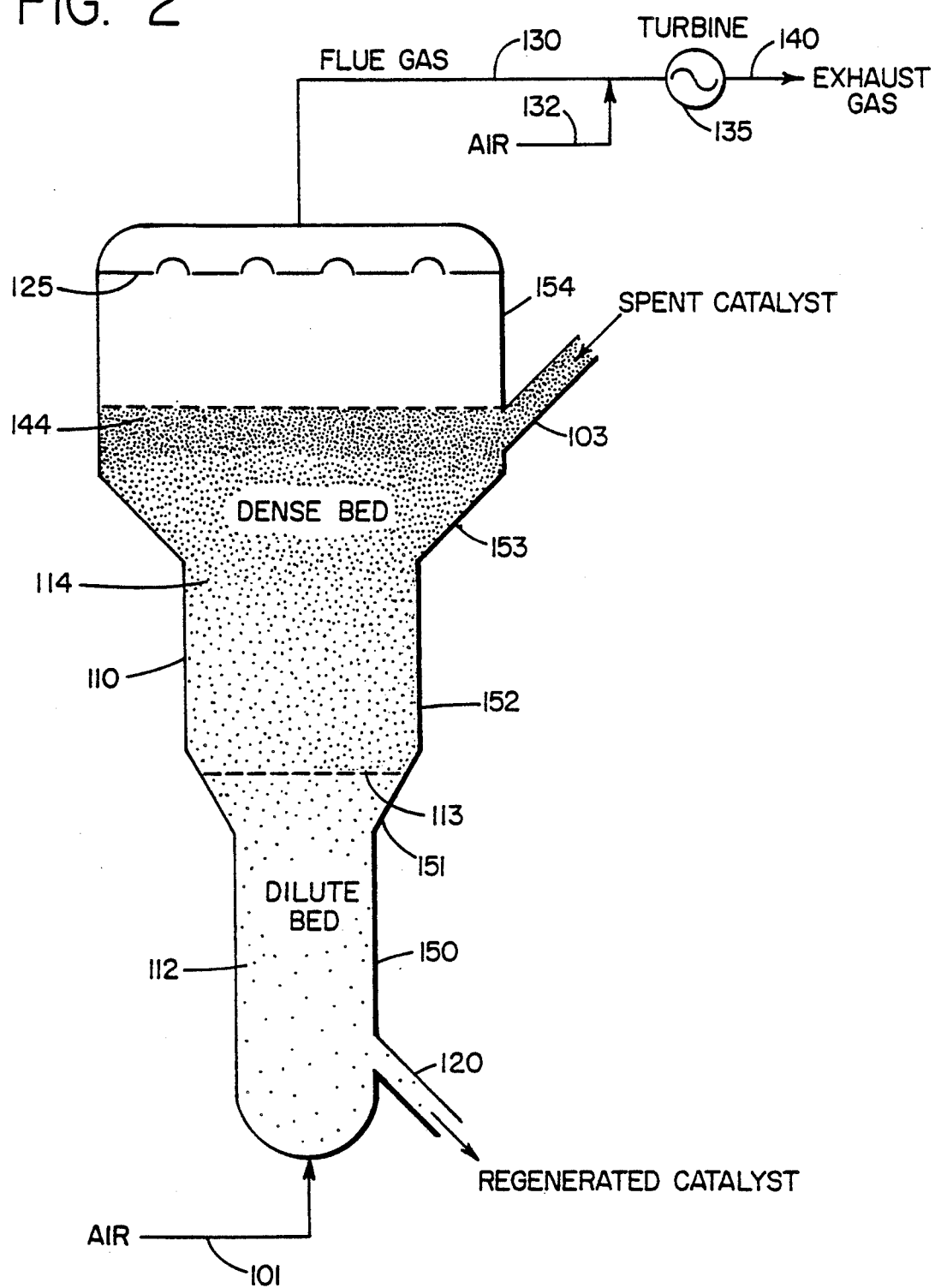
FIG. 2 is a simplified schematic diagram of another embodiment of our FCC regenerator.

In FIG. 2, an alternative regenerator is shown. Spent catalyst is added to the top of regenerator 110 via spent catalyst discharge line 103. Air is added to the bottom of the regenerator via line 101, while regenerated catalyst is removed via line 120 for recycling to the FCC reactor.

Superficial velocities are highest in the bottom of the regenerator, in dilute phase 112. There is a transition from a dilute phase to relatively dense phase at interface 113. Another interface, from relatively dense bed operation to dilute bed operation is shown as dotted line 144.

The FIG. 2 regenerator, like that shown in FIG. 1, relies on the laws of physics to determine the precise shape and location of the interface between beds. This regenerator, like the inverted cone regenerator shown in FIG. 1, also allows a certain amount of flexibility between the relative amounts of the regenerator devoted to intensely backmixed dilute phase regeneration (in zone 112) and very mild regeneration (in dense phase zone 114). By increasing the gas velocity, it is possible to move interface 113 from the base of intermediate section 152 to the upper portion of 152, or even into the transition section 153 immediately below the spent catalyst inlet.

It is also possible to allow the interface 113 to descend into the lower portion of transition section 151, until the interface rests just above lower section 150 of the regenerator.

Conventional filtration devices 125 e.g., cyclones or a filter may be used at the top of the regenerator to recover and recycle catalyst fines to the regenerator from the regenerator flue gas. Flue gas is removed via line 130 and may be discharged through turbine 135 for power recovery. Turbine exhaust gas vents to the atmosphere via line 140. Where necessary, e.g., to complete CO combustion, additional air may h=added upstream of the turbine via line 132. In the FIG. 2 embodiment, operating without complete CO combustion in the regenerator, a power recovery turbine is preferred.

Although not shown in the drawings, it is possible to recycle catalyst from the regenerated catalyst line 120 to the upper portion of regenerator 110, with auxiliary air addition for complete air combustion.

Although not shown in either figure, it is also acceptable, and may be preferred to provide a means for recycling of exhaust gas or other relatively inert gas, to the base of the FCC regenerator or to the air line connected to the bottom of the FCC regenerator. This allows decoupling of fluidization velocity in the regenerator from air addition rates required to achieve clean catalyst. Thus if the FCC charge rate is less than normal or the feed produces less coke on the catalyst than normal, then less air will h=needed in the regenerator. To compensate, most conventional units would reduce the amounts of air added to the unit. In the present invention changing the fluidizing velocities changes the relative amount of the regenerator devoted to intense regeneration in the dilute phase and gentler regeneration in the relatively dense phase. It may be better to keep the superficial vapor velocity constant, even though the air rate is reduced. Recycle of inert flue gases, or diluting the combustion air with inerts will then be practiced to keep vapor velocity constant.

Figure 3:
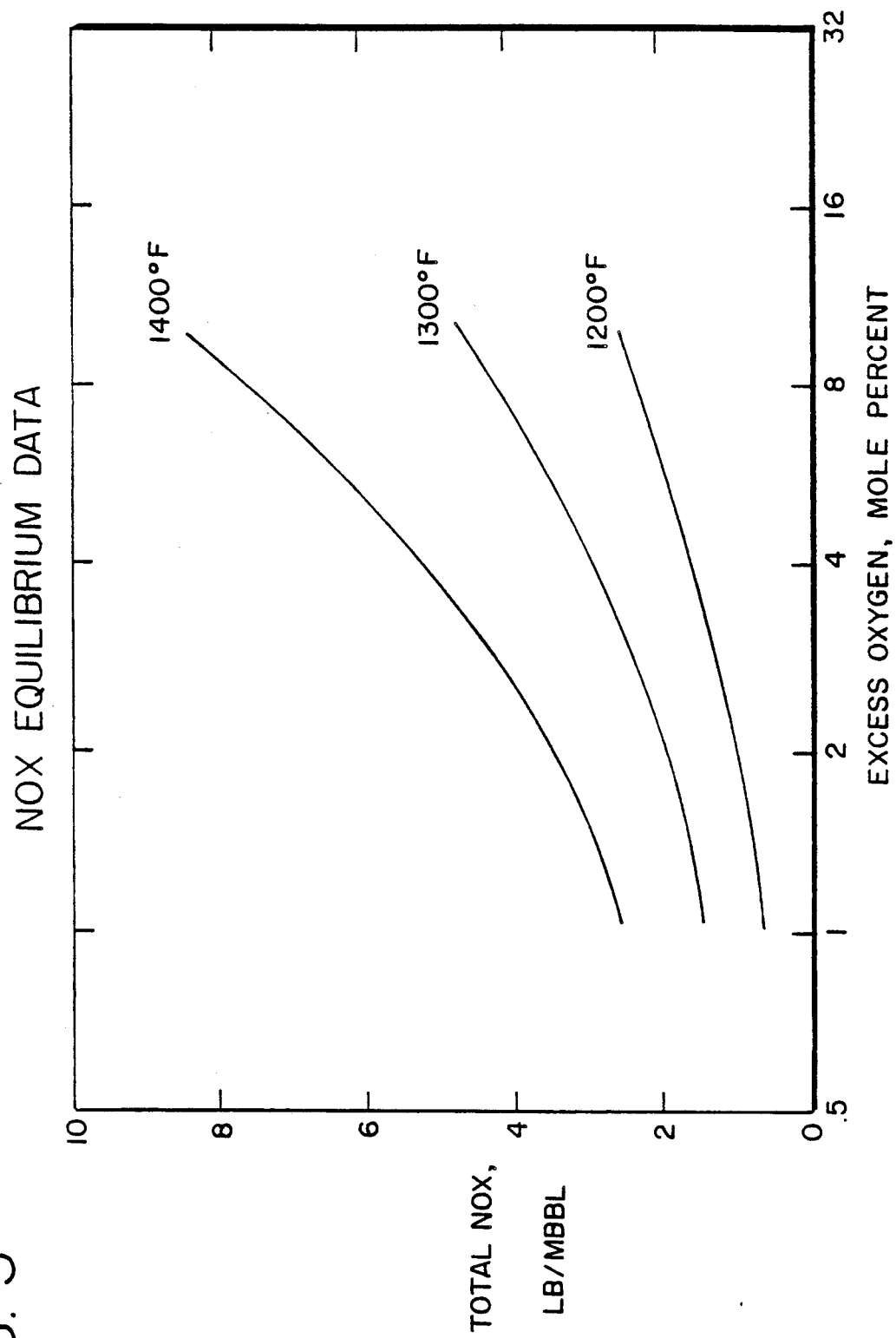
FIG. 3 shows the effect of excess oxygen and temperature on calculated equilibrium $NO_x$ emissions.
Figure 4:
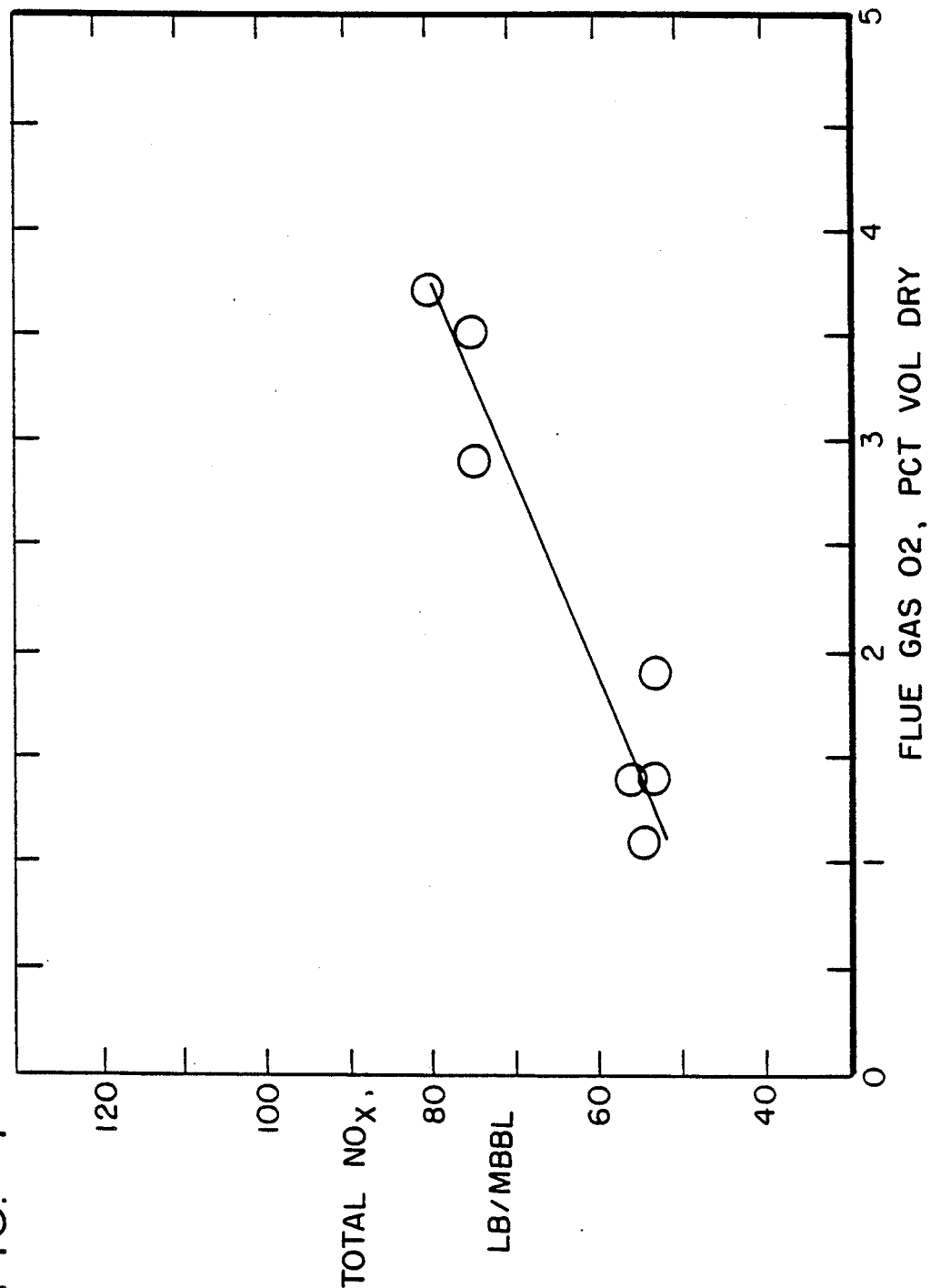
FIG. 4 shows the effect of excess oxygen on $NO_x$ emissions from a typical prior-art FCC regenerator.

FIG. 3 shows the equilibrium amount of $NO_x$ that is formed, based on calculations. As can be seen from the equilibrium data, increasing either the oxygen content of the flue gas or increasing the regenerator temperature increases $NO_x$ emissions. Field experience has shown that actual $NO_x$ emissions from many of these regenerators are typically greater than those predicted by the equilibrium calculations, although the sensitivity to oxygen content follows the same general behavior, as illustrated in FIG. 4. These data indicate that significant reductions in $NO_x$ emissions can be achieved by burning most of the coke from catalyst in an atmosphere with as little excess oxygen, and at as low a temperature, as possible. In contrast to typical prior art units, the FCC regenerator design of the present invention allows much of the coke to be burned in a low excess $O_2$ atmosphere at relatively low temperature to drastically reduce $NO_x$ emissions. By using countercurrent flow, and intense backmixing at the bottom of the FCC regenerator, we can still achieve very clean regenerated catalyst. Therefore, in our design efficient coke removal is achieved.

Figure 5:
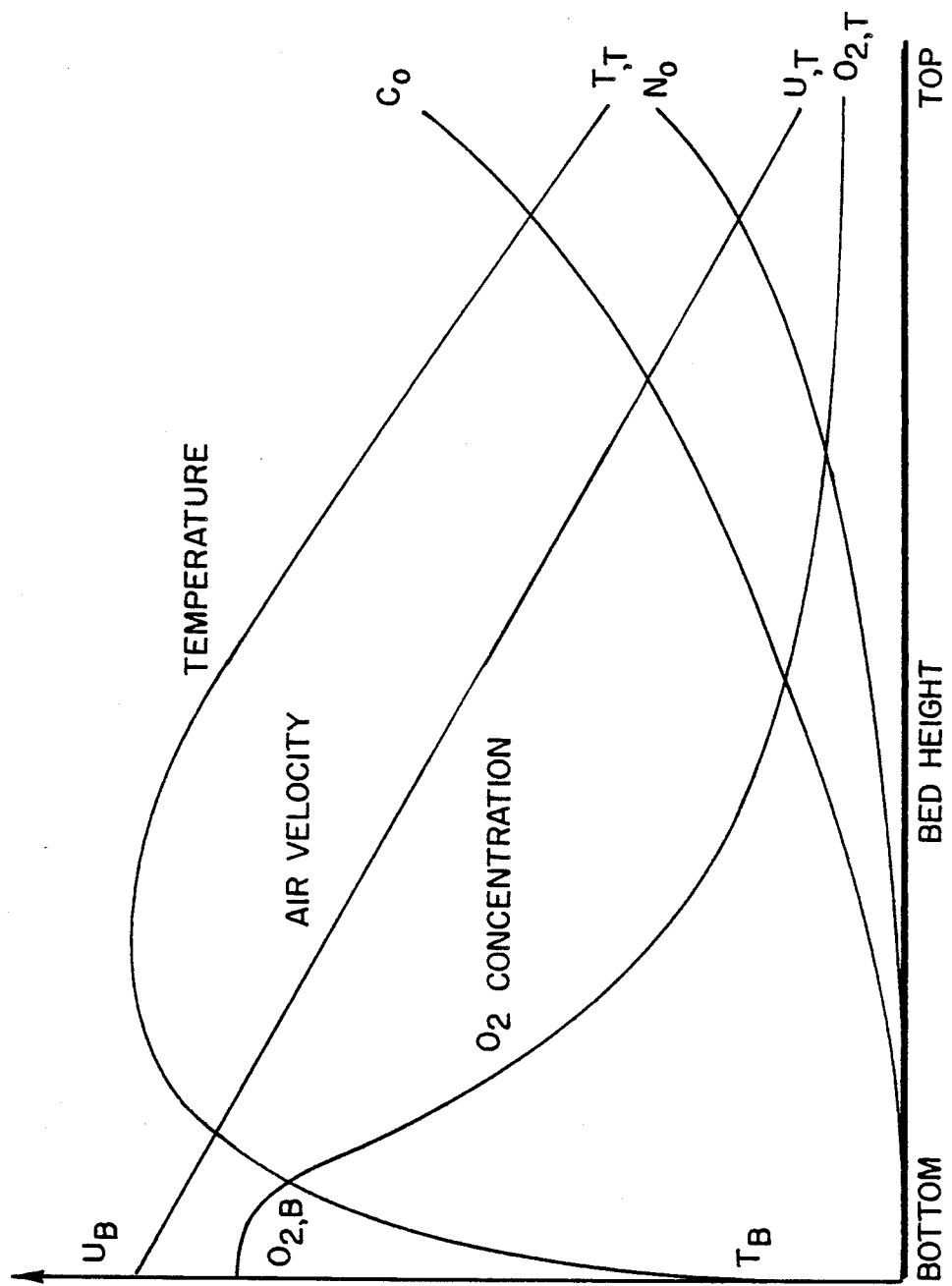
FIG. 5 is a schematic process profile showing temperatures and reactant concentrations at various positions within our FCC regenerator.

The operation of our regenerator can be better understood by reference to FIG. 5, which illustrates relative changes in temperature, superficial velocity and oxygen concentration experienced in the FCC regenerator design shown in FIG. 1, i.e., the inverted cone. Similar profiles would be seen if the regenerator design in FIG. 2 were used, but the air velocity would not change smoothly in the FIG. 2 design because the change in cross sectional area of the regenerator (and the fluidizing intensity and superficial vapor velocity in the regenerator) is not linear with height.

The temperature in the bottom of the regenerator starts out relatively low, because the incoming regeneration air is usually cooler than the descending catalyst. Air velocity, or superficial vapor velocity in the regenerator decreases from a maximum velocity at the bottom of the regenerator to a minimum velocity at the top. The oxygen concentration is highest in the bottom of the regenerator, where high oxygen concentrations are essential to burn the last traces of coke from the catalyst before it returns to the FCC unit, and lower in the reducing area of the regenerator.

The $NO_x$ concentration profile within the bed has an appearance similar to that of the bed temperature profile shown in FIG. 3. There is little or no $NO_x$ at the air inlet, at the bottom of the dilute bed. The $NO_x$ concentration then increases as $NO_x$ is readily formed from the coke combustion that occurs with increases up through the dilute phase bed where there is high oxygen concentration and intense coke burning. The $NO_x$ concentration profile maximizes near the transition zone from dilute to dense phase burning, where the bulk of high intensity coke combustion is occuring. This region in the bed corresponds to that of the temperature profile maximum. The $NO_x$ then decreases with increasing height in the bed for two reasons. First, $NO_x$ which is formed lower in the bed is reduced by reaction with CO, the concentration of which increases with increasing bed height in response to decreasing oxygen concentration and increasing coke concentrations on spent catalyst which is entering the regenerator in the upper part of the bed. Second, due to the relatively oxygen deficient environment in the upper portion of the bed, as indicated in the oxygen profile shown in FIG. 3, the selectivity for converting coke nitrogen to $NO_x$ is greatly lessened. Therefore, for the coke combustion which occurs in the upper portion of the dense bed, a relatively small proportion of coke nitrogen is converted to $NO_x$. The resultant $NO_x$ emissions in the present regenerator design will therefore be reduced, usually to only 35 to 75% of the $NO_x$ emissions that would be experienced in an FCC regenerator of the prior art relying on a single, dense bed of catalyst in the bottom of the regenerator to burn the coke.

When nitrogen oxides emissions are not a problem (perhaps because pre-treatment or post-treatment of the flue gas eliminates the problem, or because local standards for $NO_x$ emission can be easily achieved in conventional FCC regenerators), the FCC regenerator design of the present invention provides a way to achieve ultra clean catalyst, with significantly lower coke levels than can be achieved in prior art units. Modern zeolite based catalysts have favorable activity/selectivity properties when coke levels are reduced to extremely low levels. Ultra clean catalyst regeneration is also beneficial for metals passivation. Much higher levels of nickel and vanadium can be temperature regeneration in an oxygen rich atmosphere. This effect was first disclosed and claimed in U.S. Pat. No. 4,162,213. The regenerator design of the present invention provides a way to achieve ultra low carbon levels on regenerated catalyst, and promote metals passivation with extremely high oxygen levels at the base of the FCC regenerator.

In another embodiment not shown, multiple air inlets providing multiple dilute phase combustion zones may be provided at the base of a regenerator. These dilute phase combustion zones may replace or supplement the conventional air grid.

Enough air inlet distributors should be provided for adequate air distribution in the regenerator. This will depend on the size of the regenerator, and the cost of each air inlet, and associated piping. Whenever the conventional regenerator has a generally cone-shaped bottom, as in U.S. Pat. No. 3,904,548 and 3,817,280 it is possible, and preferred, to add a significant portion of the combustion air to the base of the regenerator, e.g. 10–50% of the combustion air. The remainder of the combustion air is preferably added by the conventional air grid, or by superposed dilute phase air inlets.

If the natural cone shape is not steep enough to provide a dilute phase at the base of the regenerator, then firebrick, gunnite, etc. can create the needed geometry. This reduces the amount of air that must be added via the pipe grid or other air distributors. It may be necessary to selectively plug nozzles in the conventional air distributor, to ensure that enough pressure drop occurs across the nozzles to keep all the remaining open nozzles active. If one-half of the combustion air is added via an elutriating air distributor at the base of the regenerator, then one-half of the air nozzles can be plugged. There will still be the same amount of attrition occurring around each active nozzle, but overall the amount of attrition will be reduced by one-half.

The operation of a swirl type regenerator such as shown in U.S. Pat. No. 3,817,280 will be improved if the point of catalyst withdrawal is shifted down so that more countercurrent contact of catalyst with regeneration gas will be achieved.

Two or more points of catalyst withdrawal may also be used simultaneously, i.e., the conventional one shown in U.S. Pat. No. 3,817,280, above the air grid and one or more at lower elevations in the regenerator. This approach generates simultaneously two grades of catalyst-conventional and ultra-low carbon. These two catalyst streams can be combined, or used separately in one or more FCC reactors.

FCC REACTOR

The FCC reactor is conventional, and forms no part of the present invention.

FCC FEEDSTOCKS

Feedstocks which can be used include any of those now conventionally charged to FCC units. The use of the present invention permits difficult charge stocks to be successfully cracked in an FCC unit. The amount of nitrogen compounds which can be tolerated in the feed will be increased with feeds containing 1 to 10 times as much nitrogen being prime feedstocks. Somewhat higher metals levels can be tolerated when using the present invention, especially when the FCC regenerator is operating in complete CO combustion mode, with CO combustion promoter added, however, this mode of operation will degrade somewhat the $NO_x$ reduction capabilities of the FCC regenerator of the present invention.

FCC CATALYST

Any conventional FCC catalyst can be used in the present invention. The invention does not rely on any new catalyst, it makes existing catalysts work better. Especially preferred are modern zeolite based catalyst containing 5–30 wt. % zeolites in an amorphous matrix.

CO COMBUSTION PROMOTER

The proposed invention may be used with conventional amounts of CO combustion promoter, typically Pt on an amorphous matrix, and may operate in complete or partial or non-CO combustion mode. Operation of the unit shown in FIG. 1 (with recycle of regenerated catalyst to the top of the relatively dense bed) will permit complete CO combustion, while minimizing $NO_x$ emissions, at the price of a somewhat more complicated unit.

The design shown in FIG. 2 can operate very well with conventional CO combustion promoter present, but the $NO_x$ emissions will usually increase somewhat.

COMBUSTION AIR DISTRIBUTOR

A significant benefit of the present invention is that a regenerator of the present invention need not have an air distributor. Ideally, the bottom of the FCC regenerator is an open piece of pipe, although it may contain straightening vanes or anti-whirlpool devices.

Relying on the laws of physics to keep the catalyst in its proper place is an elegant solution to the problem of getting air into contact with the FCC catalyst. The present invention avoids the significant problems that many commercial units experience when the conventional FCC air distributors fail because one of a network of pipes in the bottom of the unit breaks off. Most of the air added to the unit then vents out of one place from the stub of the broken pipe in the air inlet distributor leaving much of the bed with insufficient combustion air. The regenerator design of the present invention has superficial gas velocities in the bottom of the regenerator which keeps this portion of the regenerator totally free of catalyst. This clear region is topped by a zone of intense backmixing, which helps distribute air to some extent.

Although the preferred air inlet distributor is no air inlet distributor, other embodiments of the present invention will work very well with conventional FCC units which are modified to change the cross sectional area of the regenerator. Thus an existing FCC unit could be filled with firebrick or other inert material to take up much of the cross-sectional area available for flow in the bottom of the regenerator. Fluid dynamics would be the rest and would form the zone of intense backmixing beneath a relatively larger zone of conventional dense phase fluidized catalyst.

It is not necessary that the FCC regenerator look anything at all like the devices shown in FIG. 1 and FIG. 2. All that is essential is that the FCC catalyst pass through a relatively dense phase fluidized bed and into a relatively dilute phase bed immediately beneath the dense phase bed. A multiplicity of relatively small diameter pipes, welded to the bottom of a perforated plate accepting the pipes could provide zones of intense mixing beneath a conventional FCC catalyst bed.

FCC REGENERATOR CONDITIONS

The conditions which will be experienced in each zone of the FCC regenerator of the present invention will be briefly discussed.

TEMPERATURE

The temperature at the bottom of the dilute phase zone at the air inlet is maintained at 70° to 700° F., with a preferred range of 100° to 500° F., reaches a maximum at the point of most intense combustion in the bed of 1200° to 1550° F., with a preferred range of 1300° to 1450° F., and at the top of the dense phase bed is at a slightly lower temperature, preferably at 800° to 1200° F., with a most preferred range of 900° to 1100° F.

OXYGEN CONCENTRATION

The oxygen conceneration at the bottom of the dilute phase bed is about 21% when air is used as the fluidization gas, which is typical. The oxygen concentration decreases rapidly through the bed and begins to taper off to its final value after the point of most intense combustion in the bed. The final oxygen concentration, measured at the top of the dense phase bed is 0 to 10%, with a preferred range of 0.2 to 3%. If oxygen-enriched air is used as a fluidizing gas or if recycled combustion flue gas is included as a part of the fluidizing gas, the same final oxygen concentrations apply.

SUPERFICIAL GAS VELOCITY

In the dilute phase at the base of the regenerator the minimum velocity is that velocity which will achieve dilute phase fluidization. The maximum velocity will h=the slip velocity of the particles with the fastest settling rates.

In the dense phase bed, above and largely supported by the dilute phase zone, the superficial vapor velocity will always h=less. The minimum velocity will be that needed for incipient or minimum fluidization, though preferably velocities are sufficient to result in an aggregative fluidized bed or bubbling fluidized bed. The upper limit on superficial vapor velocity in this dense phase is that velocity which achieves lean phase fluidization with pneumatic transport.

More details of fluidization phenomenon are provided in *Fluidization Engineering*, D. Kunii and O. Levenspiel, John Wiley & Sons, Inc. (1969).

As applied to FCC regenerators the superficial gas velocity at the bottom of the dilute phase zone usually will be in the range of 10 to 50 ft/s. with a preferred range of 15 to 35 ft/s. The superficial gas velocity decreases as the cross-sectional area of the regenerator increases to final values at the top of the dense bed zone in the range of 0.05 to 4 ft/s, with a preferred range of 0.1 to 3 ft/s.

CATALYST RESIDENCE TIME

The catalyst residence time in the regenerator is controlled so as to achieve a desired level of coke removal from the spent catalyst in order to maintain proper catalyst activity and unit heat balancing. Spent catalyst typically enters the units with coke content of 0.7 to 1.1% by weight of catalyst. Regenerated catalyst typically leaves the unit with a coke content of less than 0.1% by weight of catalyst, and preferably less than 0.05% coke by weight of catalyst. Corresponding catalyst residence times in the regenerator may range broadly from 1 to 20 min, depending on the particular regenerator design an operating conditions chosen.

CATALYST WITHDRAWAL

The catalyst should be withdrawn from the bottom of the regenerator, preferably from the dilute phase. The upper limit on the point of catalyst withdrawal is the interface 13 between the dense bed and dilute phase. The lower limit is that portion of the dilute phase where superficial vapor velocities are so high that no catalyst can, even momentarily, fall to that level.

Using the process and apparatus of the invention it is possible to minimize $NO_x$ emissions and achieve catalyst with ultra low carbon levels. Efficient metals passivation can also be achieved.

The air distribution system of the present invention is inherently gentle and less erosive to the FCC catalyst. The design is also much less subject to catastrophic failure by erosion than prior art air distributors.

Although described in conjunction with FCC catalyst regeneration, it is applicable to many fluidized combustion processes.

We claim:

1. A fluidized bed combustion process wherein a combustible substance is burned with an oxygen containing gas at fluidized bed combustion conditions including a flue gas oxygen concentration of 0 to 10% oxygen, to produce a flue gas characterized by countercurrent combustion in:
    (a) a dilute phase base zone comprising a dilute phase, fluidized bed combustion zone wherein oxygen containing gas is added, said base zone having a top portion and a top cross-sectional area, and operating at dilute phase conditions including a superficial vapor velocity;
    (b) a dense phase fluidized bed zone wherein said combustible substance is added and wherein combustion occurs comprising a dense phase fluidized bed supported by and in open fluid communication with the dilute phase base zone, and wherein said dense phase fluidized bed zone has an average cross-sectional area and the cross-sectional area of said dilute phase base zone at said top portion is 15 to 90% of the average cross-sectional area of said dense phase fluidized bed zone; and
    (c) a dilute phase upper zone above said dense phase fluidized bed, characterized by a relatively lower superficial vapor velocity than said dilute phase base zone, from which said flue gas is removed.

2. The process of claim 1 further characterized in that the base zone and upper zone comprise an inverted cone, with the base zone as the base of the cone and the dense phase zone is above the base zone.

3. The process of claim 1 further characterized in that the superficial vapor velocity in the base zone is about 2 to 20 m/s and in the dense phase zone is about 0.2 to 2 m/s.

4. The process of claim 1 further characterized in that the combustion process is fluidized bed coal combustion, fluid coking regeneration or fluidized catalytic cracking catalyst regeneration.

5. The process of claim 1 further characterized in that coke on spent, nitrogen containing, coked catalyst from an FCC reactor is the combustible substance and the catalyst is added to the dense phase zone and partially regenerated in a relatively low oxygen concentration, reducing atmosphere, and the partially regenerated catalyst falls into the base zone where the catalyst regeneration is completed in a dilute phase regeneration zone characterized by relatively high oxygen partial pressure and high temperature by burning the coke to form regenerated catalyst which is withdrawn from the dilute phase base zone of the regenerator as a product and a gas mixture comprising carbon dioxide, carbon monoxide and oxides of nitrogen which gas mixtures rises into the dense phase zone of the regenerator where at least a portion of the oxides of nitrogen in the gas mixture are reduced to nitrogen.

6. The process of claim 1 further characterized in that additional oxygen containing gas is added to the dense phase zone.

7. The process of claim 1 further characterized in that CO combustion promoter is present in the base zone and dense phase zone in an amount equivalent to 0.01 to 100 weight ppm platinum.

8. The process of claim 1 wherein at least a portion of the fluidized material in the base zone is withdrawn and recycled to the dense phase portion of the dense bed, and additional combustion occurs in the presence of the recycled material.

9. A fluidized bed combustion process wherein a fluidizable combustible substance is burned with an oxygen containing combustion gas at fluidized bed combustion conditions to produce a flue gas having an oxygen concentration of 0 to 10% oxygen, characterized by countercurrent flow of said combustible substance and combustion gas through a dilute phase base zone, a dense phase fluidized bed zone supported by and in open fluid communication with said dilute phase bed zone, and a dilute phase upper zone above said dense phase fluidized bed zone, and wherein:
    (a) said dilute phase base zone has a top portion and a bottom portion and an average cross sectional area, an inlet for said oxygen containing combustion gas and wherein said combustion gas is added in an amount sufficient to provide a superficial vapor velocity, in at least some portions of said base zone, of about 2 to 20 m/s, and sufficient to maintain dilute phase, fluidized bed conditions in said base zone;
    (b) said dense phase fluidized bed zone has an upper portion and a lower portion and an average cross sectional area, an inlet for said fluidizable combustible substance in said upper portion, and wherein combustion air passes up into said dense phase fluidized bed from the top of said dilute phase base zone in an amount sufficient to provide a superficial vapor velocity of about 0.2 to 2 m/s and sufficient to maintain dense phase fluidized bed conditions is said dense phase fluidized bed and wherein the cross-sectional area of the top of said dilute phase base zone is 15 to 90% of the average cross-sectional area of said dense phase fluidized bed zone; and
    (c) said dilute phase upper zone is above said dense bed and wherein flue gas produced by combustion in said dense phase fluidized bed is discharged into said dilute phase upper zone.

* * * * *